United States Patent
Tang

(10) Patent No.: US 7,185,132 B2
(45) Date of Patent: Feb. 27, 2007

(54) USB CONTROLLER WITH INTELLIGENT TRANSMISSION MODE SWITCHING FUNCTION AND THE OPERATING METHOD THEREOF

(75) Inventor: Don Tang, Taipei (TW)

(73) Assignee: Via Technologies, Inc., Taipei (TW)

( * ) Notice: Subject to any disclaimer, the term of this patent is extended or adjusted under 35 U.S.C. 154(b) by 95 days.

(21) Appl. No.: 11/028,209

(22) Filed: Jan. 4, 2005

(65) Prior Publication Data

US 2006/0080490 A1   Apr. 13, 2006

(30) Foreign Application Priority Data

Sep. 17, 2004  (TW) ................ 93128311 A

(51) Int. Cl.
*G06F 13/14* (2006.01)
(52) U.S. Cl. .................. 710/305; 710/105; 710/316
(58) Field of Classification Search .................. 710/8, 710/10, 14, 16–18, 45, 58, 62, 72, 100, 300, 710/104–105, 305, 313, 316
See application file for complete search history.

(56) References Cited

U.S. PATENT DOCUMENTS

| | | | | |
|---|---|---|---|---|
| 5,784,581 | A * | 7/1998 | Hannah ................. | 710/110 |
| 6,516,205 | B1 * | 2/2003 | Oguma ................. | 455/557 |
| 6,920,569 | B1 * | 7/2005 | Wauters et al. ........ | 713/300 |
| 7,024,504 | B2 * | 4/2006 | Saito et al. ........... | 710/110 |
| 2003/0212841 | A1 * | 11/2003 | Lin ..................... | 710/62 |
| 2004/0088449 | A1 * | 5/2004 | Sakaki ................. | 710/15 |
| 2004/0225836 | A1 | 11/2004 | Lin | |
| 2005/0114580 | A1 * | 5/2005 | Ede ..................... | 710/305 |
| 2006/0045112 | A1 * | 3/2006 | Laiho .................. | 370/419 |

FOREIGN PATENT DOCUMENTS

| | | |
|---|---|---|
| CN | 1438582 | 8/2003 |
| TW | 581316 | 3/2004 |

OTHER PUBLICATIONS

ML60841 Host + Device Controller LSI, OKI Semiconductors, Oct. 2, 2002.*
USB Definition, Interfacebus.com.*
USB On-The-Go Basics, Dallas Semiconductor, Dec. 20, 2002.*

* cited by examiner

*Primary Examiner*—Khanh Dang
(74) *Attorney, Agent, or Firm*—Rosenberg, Klein & Lee

(57) ABSTRACT

There is provided a USB controller with an intelligent transmission mode switching function and the operating method thereof. The USB controller includes a host controller, a device controller, a data line set, and a monitor unit, wherein the data line set includes a D+ data line and a D− data line which are manipulated by the monitor unit to selectively couple to the host controller and a device controller. By way of the switching manipulation provided by the monitor unit, the transmission mode of the USB controller can be periodically switched between the host mode and the device mode, so that the transmission mode of the USB controller can be detected and settled readily in order to conduct data communication with other devices.

15 Claims, 4 Drawing Sheets

USB CONTROLLER WITH INTELLIGENT TRANSMISSION MODE SWITCHING FUNCTION AND THE OPERATING METHOD THEREOF

FIELD OF THE INVENTION

The present invention is related to a USB controller and the operating method thereof, and more particularly to a USB controller with an intelligent transmission mode switching function and the operating method thereof, in which a monitor unit is employed to allow the USB controller to be periodically switched between the host mode and the device mode.

BACKGROUND OF THE INVENTION

With the rapid development in digitalization technology, the digital electronic product has become an indispensable appliance in the daily life of modern people. The technology of allowing two or more electronic products to share and distribute data with each other is increasingly gaining great significance. Universal serial bus (USB) is by far the most popular data communication interface because of its high data transmission rate, hot-swappable functionality and plug-and-play (PnP) capability. The advantages of the USB data communication interface have provided adequate flexibility for the development and research in the application of electronic product. The leading companies in the field of computer product manufacturing have been striving for the presentation of electronic products with a USB interface. However, the conventional electronic device with a USB interface is generally designed as a USB device, which indicates the electronic device can conduct data communication with other USB devices only when it is connected to an information-processing product provided with a USB host controller (e.g. a host computer). Without the aid of a host computer, two or more USB devices can not conduct mutual data communication with each other. This would limit the utility of a USB device when it is desired to perform data communication with other devices. Hence, the technology that provides a USB controller to allow two or more USB devices to conduct peer-to-peer data communication without the need of a host computer has become a prospect that most of the computer manufacturer are striving for.

Certain of the computer manufacturers dedicated their efforts to promote an extended version of the USB data communication interface standard, namely USB On-The-Go (USBOTG), which attempts to enable all the electronic products complying with USB OTG standard to conduct data communication without the intervention of a host computer. A conventional USB OTG controller is illustrated in FIG. 1. The USBOTG controller 10 shown in FIG. 1 is founded based on an extension of USB 2.0 standard, and comprising a host controller 11, a device controller 13, and an OTG controller 19, wherein the host controller 11 is used for carrying out the host mode operation, and the device controller 13 is used for carrying out the device mode operation. Both of the host controller 11 and the device controller 13 are connected to the OTG controller 19, and the OTG controller 19 is capable of detecting whether the device connected to a USB connection port is a USB device or a USB OTG device via the ID signal line 191. If the device connected to the USB connection port is a USB device, the OTG controller 19 manipulates the USB transceiver 171 to be connected to the D+ signal line 151 or D− signal line 152 in order to conduct data communication with the USB device. If the device connected to the USB connection port is a USB OTG device, the OTG controller 19 manipulates the OTG transceiver 173 to be connected to the D+ signal line 151 or D− signal line 152 in order to conduct data communication with the USB OTG device. In addition, the OTG controller 19 is further capable of detecting the potential on the ID signal line 191 to determine whether the USB OTG controller is to conduct data communication with the connected device under the host mode or under the device mode.

The aforementioned USBOTG controller is capable of conducting peer-to-peer bi-directional data communication with an electronic device having a USB interface or a USB OTG interface without the need of a host computer. However, the circuit architecture of a USB OTG controller is more complicated than that of a USB controller, in which an OTG controller is required and an OTG transceiver is essential because the potential required in the data communication in a USB OTG controller is different with that in a USB controller. Consequently, the manufacturing cost of a USB OTG controller is significantly boosted due to the magnificent alteration in the circuit architecture. More disadvantageously, the USB communication protocol is necessary to be modified in response to the adaptation of the USB OTG controller, which will burden the product development of a USB device manufacturer and designer.

SUMMARY OF THE INVENTION

Therefore, the present invention focuses its attention on proposing a USB controller with an intelligent transmission mode switching function and the operating method thereof to address the drawbacks lingered in the prior art. In the inventive USB controller, the detection of the transmission mode can be accomplished with ease and readiness by an intrinsic communication protocol, and the USB controller is capable of conducting data communication with other USB products without the intervention of a host computer.

A first object of the present invention is to provide a USB controller with an intelligent transmission mode switching function without the need of changing the circuitry and the specification of the connection port and the wiring of the existing USB interface, and which is capable of respectively conducting peer-to-peer data communication without the intervention of a host computer.

A second object of the present invention is to provide a USB controller with an intelligent transmission mode switching function, in which a monitor unit is employed to enable the transmission mode of the USB controller to be switched between a host mode and a device mode to adaptively conduct data communication with a USB device and a USB host.

A third object of the present invention is to provide a USB controller with an intelligent transmission mode switching function, in which a monitor unit is employed to monitor the variation in the potential on the data line set under the host mode or under the device mode, and thereby determine if the connected USB device is a USB host or a USB device.

A fourth object of the present invention is to provide an operating method of a USB controller provided with an intelligent transmission mode switching function, wherein the method is carried out by setting a first time interval and a second time interval, and enabling the USB controller to perform the host mode operation in the first time interval and perform the device mode operation in the second time interval, and thereby allow the USB controller to conduct data communication with a connected USB host and a connected USB device, respectively.

A fifth object of the present invention is to provide an operating method of a USB controller provided with an intelligent transmission mode switching function, wherein the method sets a first time interval and a second time interval that are followed mutually to form a periodic circulation, in order to readily and accurately determine if the connected USB device is a USB host or a USB device.

A sixth object of the present invention is to provide an operating method of a USB controller provided with an intelligent transmission mode switching function, wherein the method sets a first time interval and a second time interval and sets the duration of the first time interval to be larger than the duration of the second time interval, in order that the USB controller will not be short-circuited under the host mode operation when a USB host is plugged into the system where the USB controller is embedded.

To attain the foregoing objects, the present invention provides a USB controller with an intelligent transmission mode switching function, which includes: a host controller for performing a host mode operation by a USB interface, a device controller for performing a device mode operation by a USB interface, a data line set including a D+ data line and a D− data line for transmitting data, and a monitor unit for manipulating the data line set to be connected to one of the host controller and the device controller and detecting the variation in the potential on the data line set to determine the transmission mode of the USB controller.

Further, the present invention provides an operating method of a USB controller with an intelligent transmission mode switching function, which includes the steps of: setting a first time interval and a second time interval; determining if the potential on the data line set in the USB controller is pulled up within the first time interval; if the potential on the data line set of the USB controller is pulled up within the first time interval, enabling the USB controller to conduct data communication under the device mode; if the potential on the data line set of the USB controller is not pulled up within the first time interval, enabling the USB controller to conduct data communication under the host mode; determining if the potential on the data line set in the USB controller is pulled up within the second time interval; if the potential on the data line set of the USB controller is pulled up within the second time interval, enabling the USB controller to conduct data communication under the host mode; if the potential on the data line set of the USB controller is not pulled up within the second time interval, enabling the USB controller to conduct data communication under the device mode.

The foregoing and features and advantages of the present invention will become more apparent through the following descriptions with reference to the accompanying drawings, in which:

DETAILED DESCRIPTION OF THE PREFERRED EMBODIMENT

Figure 1:
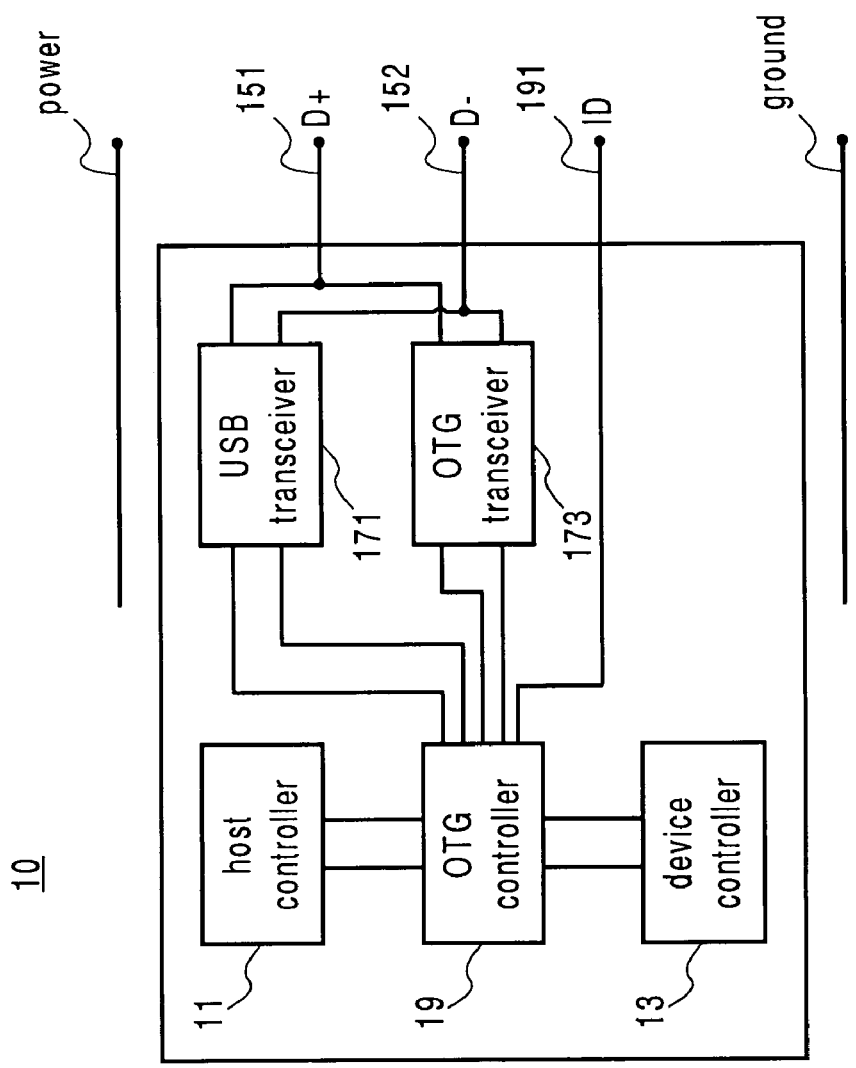
FIG. 1 shows a representation of a USB OTG controller according to the prior art.
Figure 2:
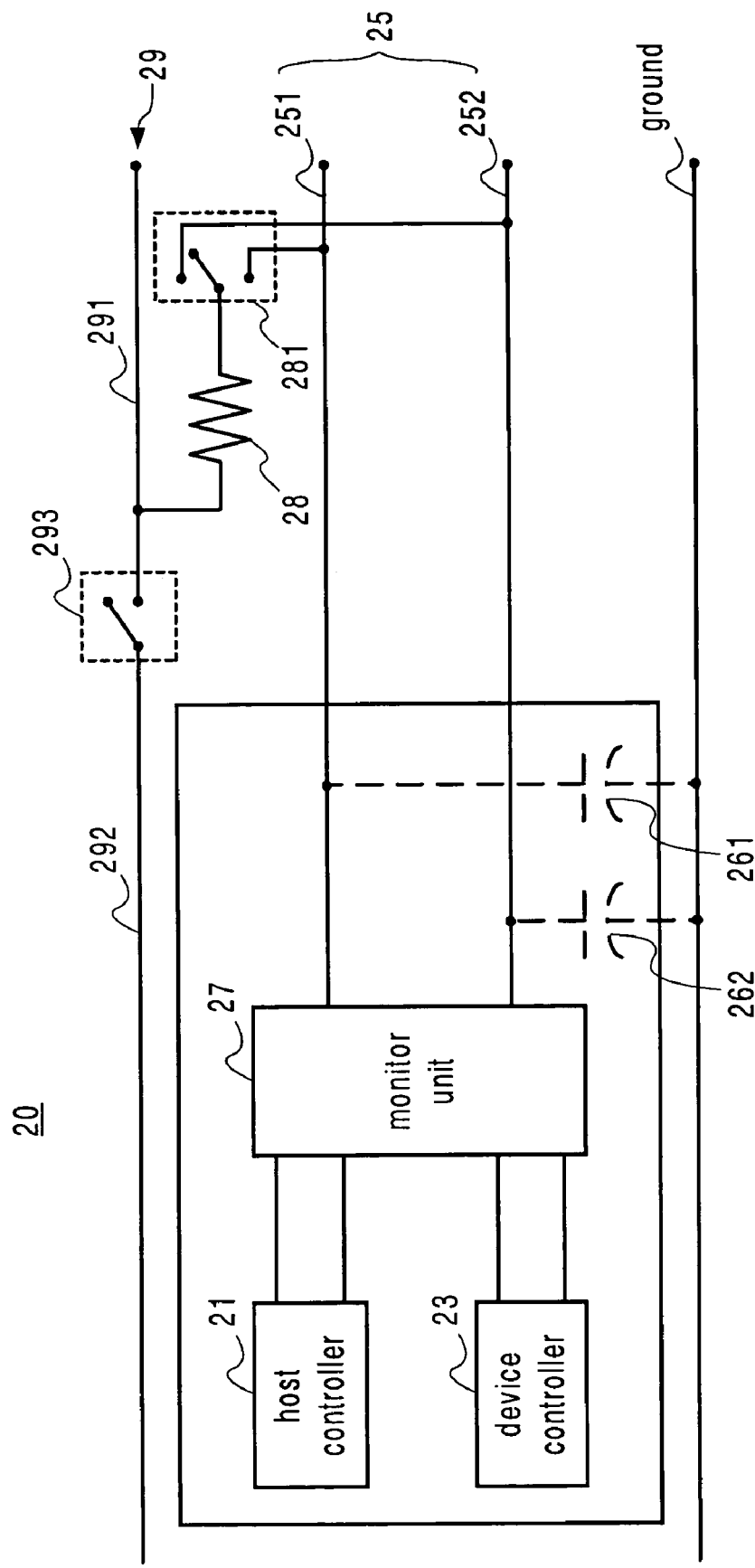
FIG. 2 shows a representation of a USB controller according to a preferred embodiment of the present invention.

Referring to FIG. 2, which shows a USB controller with an intelligent transmission mode switching function according to a preferred embodiment of the present invention. As shown in FIG. 2, the USB controller 20 of the present invention comprises a host controller 21, a device controller 23, a data line set 25, and a monitor unit 27, in which the data line set 25 comprises a D+ data line 251 and a D− data line 252 that can be selectively coupled to the host controller 21 to perform the host mode operation or coupled to the device controller 23 to perform the device mode operation according to the switching manipulation of the monitor unit 27. In addition, the monitor unit 27 is capable of detecting the variation in the potential on the data line set 25 under the host mode and under the device mode. If it is detected that the potential on the data line set 25 is pulled up under the host mode, it is determined that the connected USB device is a USB device, and then the USB controller can conduct data communication with the USB device under the host mode. Otherwise, If it is detected that the potential on the data line set 25 is pulled up under the device mode, it is determined that the connected USB device is a USB host, and then the USB controller can conduct data communication with the USB device under the device mode.

Remarkably, the present invention allows the wiring of the power line 29 to be partly modified. As shown, the power line 29 is divided into a front-end power line 291 and a back-end power line 292 which are connected in series by a switch 293. The front-end power line 291 is provided with a pull-up resistor 28 that is coupled to the front-end power line 291 on one end and is coupled to an adapter 281 on the opposite end. The adapter 281 is used for selectively coupling the pull-up resistor 28 to the D+ data line 251, coupling the pull-up resistor 28 to the D− data line 252, or forming an open circuit.

The operation of the switch 293 and the adapter 281 is performed in response to the switching manipulation of the monitor unit 27. When the monitor unit 27 couples the data line set 25 to the host controller 21, the USB controller 20 carries out the host mode operation. Also, the switch 293 is ON and the adapter 281 is open-circuited. In the meantime, if a USB device is plugged in, the monitor unit 27 can detect the rising of the potential on the D+ data line 251 or the rising of the potential on the D− data line 252 according to the USB interface communication protocol (the D+ data line will be selected in high-speed or full-speed communication and the D− data line will be selected in low-speed communication), and then the USB controller 20 can be assured to conduct data communication under the host mode.

When the monitor unit 27 couples the data line set 25 to the device controller 23, the USB controller 20 carries out the device mode operation. Also, the switch 293 is OFF and the adapter 281 is selectively coupled to the D+ data line 251 or the D− data line 252 (the D+ data line will be selected in high-speed or full-speed communication and the D− line will be selected in low-speed communication). In the meantime, if a USB host, such as a host computer, is attached, the USB host can supply a voltage potential via power lines to pull up the potential on the D+ data line 251 and the potential on the D− data line 252 via the conduction of the pull-up resistor 28 and the adapter 281. Under this condition, the monitor unit 27 can detect the rising of the potential on the data line set 25, and then the USB controller 20 can be assured to conduct data communication under the device mode.

By way of the USB controller, the computer manufacturer can provide a USB controller capable of operating under host mode and under the device mode using the existing connection port and wiring specification outlined in the USB interface, so that a USB device can conduct peer-to-peer data communication with other USB devices without the intervention of a host computer. In this case, the convenience of applying the USB device to carry out data communication is enhanced, and the difficulty in product development and the manufacturing cost of the product are abated significantly, and further a vast economical profit is obtained without effort.

Figure 3:
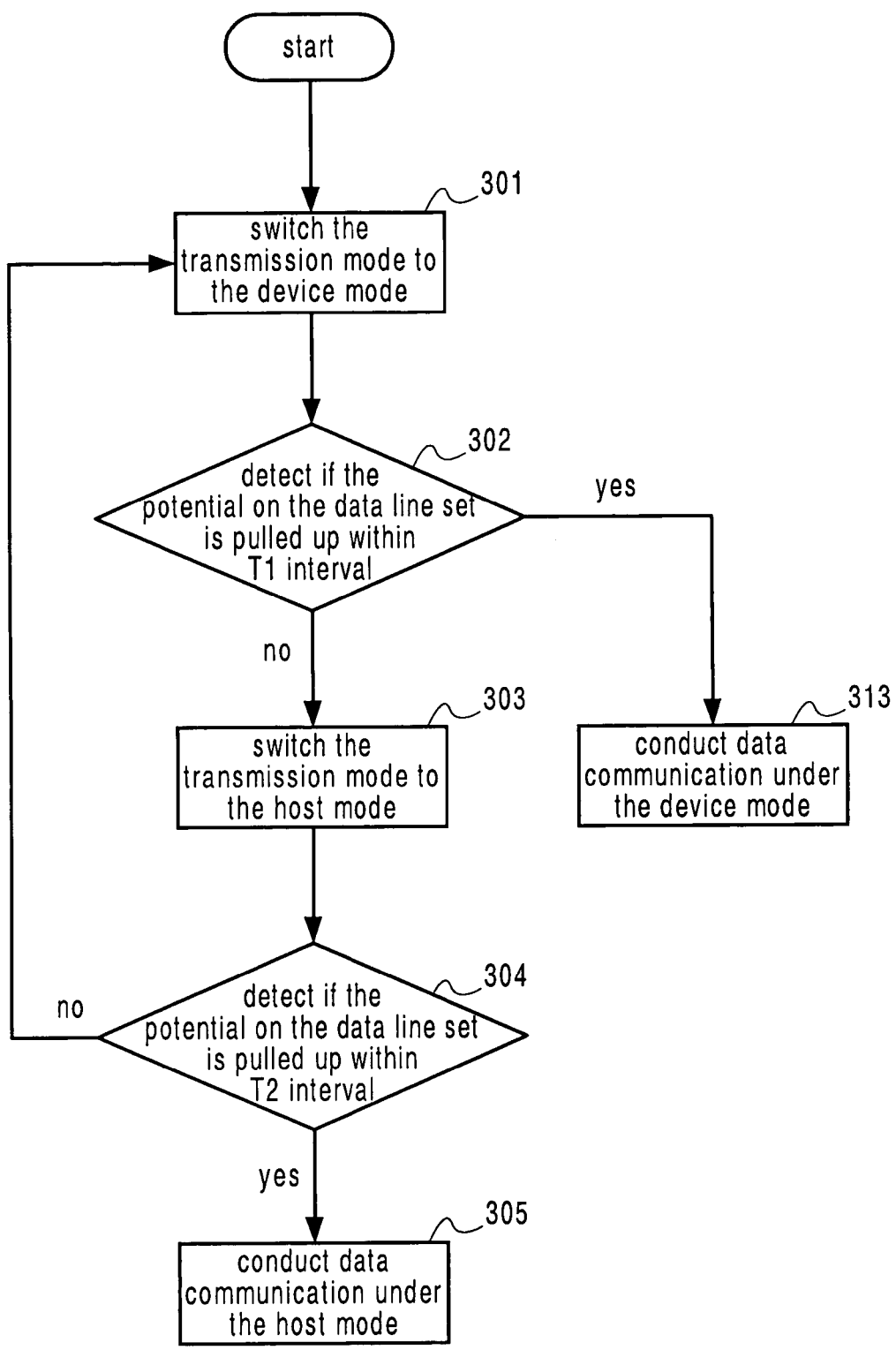
FIG. 3 shows the flowchart of the operating method of a USB controller according to a preferred embodiment of the present invention.
Figure 4A:
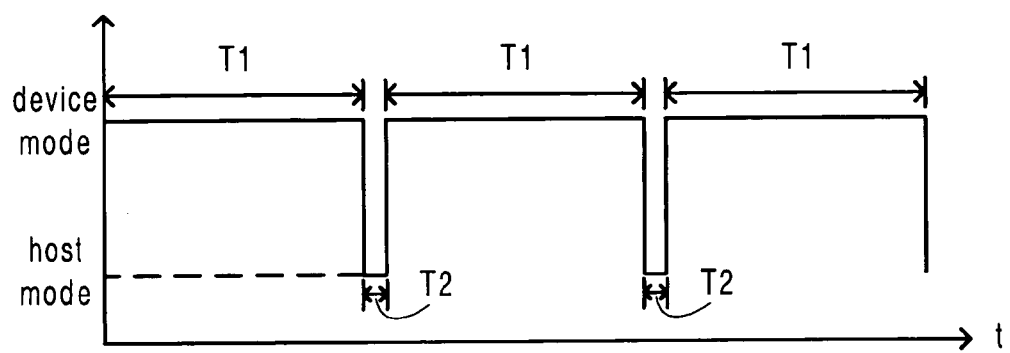
FIG. 4A shows the timing diagram illustrating the transmission mode switching operation performed by a USB controller according to a preferred embodiment of the present invention.

Referring to FIGS. 3 and 4A, which shows the steps of operating method and the transmission mode switching timing diagram thereof according to a preferred embodiment of the present invention. As shown, the steps involved in the operating method according to a preferred embodiment of the present invention includes: setting a first time interval T1 and a second time interval T2, switching the transmission mode of the USB controller (20) to the device mode in the first time interval T1 at step 301, and detecting if the potential on the D+ data line (251) or the potential on the D− data line (252) is pulled up within the first time interval T1 by the monitor unit (27) at step 302. If yes, the connected device is determined to be a USB host, and the USB controller is required to conduct data communication with the connected device under the device mode at step 313. If not, the transmission mode of the USB controller is switched to the host mode when the first time interval T1 is terminated and the second time interval T2 is initiated at step 303.

In the meantime, the monitor unit is employed to detect if the potential on the D+ data line or the potential on the D− data line is pulled up within the second time interval T2 at step 304. If yes, the connected device is determined to be a USB device, and the controller is required to conduct data communication with the connected device under the host mode at step 305. If not, the transmission mode of the USB controller will be switched to the device mode when the second time interval T2 is terminated and the first time interval T1 is initiated. The method then continues with step 301 and the subsequent steps thereof to form an iterative flow path.

In the USB communication interface specification, a USB host can supply electric power to a USB device via power lines. In order to avoid the conflicts of power supply when the USB controller of the present invention is operating under the host mode and is coupled to a USB host, the duration of the first time interval T1 which is set to allow the USB controller to perform the device mode operation is set to be larger than the duration of the second time interval T2 which is set to allow the USB controller to perform the host mode operation. When the duration of the first time interval T1 is far larger then the duration of the second time interval T2, the probability of causing conflicts of power supply is proximate to zero.

Please refer to FIG. 2, in which the equivalent capacitor of the D+ data line 251 and the equivalent capacitor of the D− data line 252 are represented by a first capacitor 261 and a second capacitor 262, respectively. In order to prevent the charging/discharging effect from interfering the monitor unit 27 on the detection of the variation in the potential on the data line set 25, the duration of the second time interval T2 can be set to be slightly larger than the discharging time of the first capacitor 261 and the discharging time of the second capacitor 262, while the duration of the first time interval T1 can be set by user in accordance with demands on system performance. In this way, the USB controller according to the present invention can readily and accurately determine if the connected device is a USB host or a USB device, and thereby ensure the correct transmission mode the USB controller should be under and enable the USB controller to conduct data communication with the connected device.

Figure 4B:
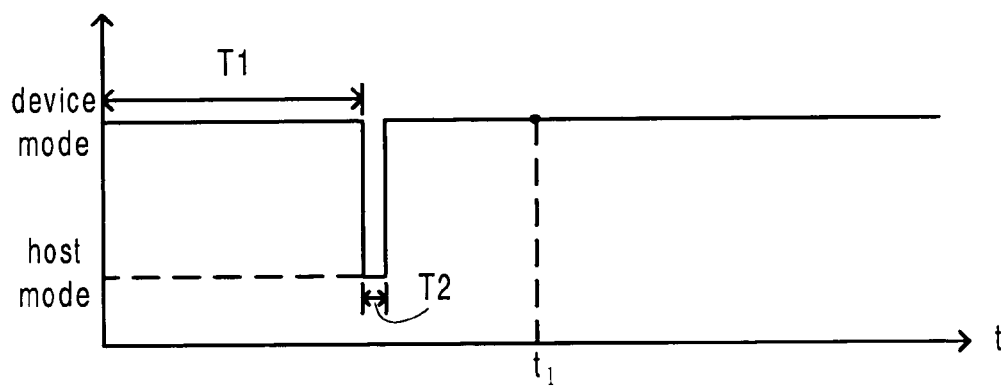
FIGS. 4B and 4C show the timing diagrams illustrating the transmission mode switching operation performed by a USB controller according to a preferred embodiment of the present invention, in which a USB device is plugged in at time t1.
Figure 4C:
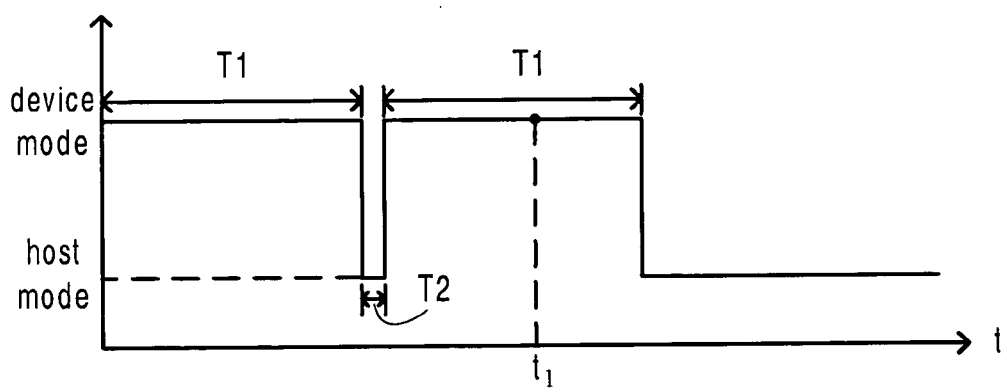

At last, please refer to FIGS. 4B and 4C, which show the timing diagrams illustrating the transmission mode switching operation performed by a USB controller according to a preferred embodiment of the present invention, in which a USB device is plugged in at time t1. As shown in the diagrams, the USB controller is configured to perform the device mode operation in the first time interval T1, wherein the duration of the first time interval T1 is set by user in accordance with demands on system performance and is larger than the duration of the second time interval T2. Therefore, the USB controller would spend more time on the device mode operation, and the probability of allowing an external electronic device to be coupled to the USB controller under the host mode is lowered, so as to provide a failsafe protection for the USB controller.

In the case that a user plugs a USB device into the system at time t1, and if the monitor unit detects the rising of the potential on the data line set within the time interval T1, it can be assured that the connected device is a USB host and that the USB controller performs the device mode operation to conduct data communication with the connected USB device, as shown in FIG. 4B. If the monitor unit does not detect the rising of the potential on the data line set within the time interval T1, the transmission mode of the USB controller automatically switches to the host mode when the first time interval T1 is terminated and the second time interval T2 is initiated. If the monitor unit detects the rising of the potential on the data line set within the time interval T2, it can be assured that the connected device is a USB device and that the USB controller performs the host mode operation to conduct data transmission and communication negotiation with the connected USB device.

In summary, the present invention provides a USB controller and the operating method thereof, and more particularly the present invention provides a USB controller with an intelligent transmission mode switching function and the operating method thereof. The USB controller according to the present invention employs a monitor unit to manipulate the USB controller to be periodically switched its transmission mode between the host mode and the device mode, so that the detection of the transmission mode can be accomplished readily and easily by an intrinsic communication protocol, and the peer-to-peer data communication with other USB devices can be achieved without the intervention of a host computer.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A USB controller with an intelligent transmission mode switching function, comprising:
   a data line set including a D+ data line and a D− data line for transmitting data;
   a monitor unit coupled to said data line set;
   a host controller coupled to said monitor unit for performing a host mode operation by a USB interface;
   a device controller coupled to said monitor unit for performing a device mode operation by a USB interface, said monitor unit selectively coupling one of the host controller and the device controller to said data line set responsive to said monitor unit detecting a variation of a potential on the data line set to determine a transmission mode of the USB controller;
   a power line including a front-end power line and a back-end power line, connected in series by a switch;
   a pull-up resistor having one end connected to the front-end power line; and
   an adapter connected to the other end of the pull-up resistor for selectively coupling the pull-up resistor to one of the D+ data line and the D− data line.

2. The USB controller with an intelligent transmission mode switching function according to claim 1, wherein the switch is selectively configured to be ON or OFF in response to the manipulation of the monitor unit.

3. The USB controller with an intelligent transmission mode switching function according to claim 1, wherein the adapter is selectively configured to be coupled to the D+ data line, to be coupled to the D− data line, or to form an open circuit in response to the manipulation of the monitor unit.

4. The USB controller with an intelligent transmission mode switching function according to claim 2, wherein the switch is ON when the USB controller is operating under the host mode.

5. The USB controller with an intelligent transmission mode switching function according to claim 2, wherein the switch is OFF when the USB controller is operating under the device mode.

6. The USB controller with an intelligent transmission mode switching function according to claim 3, wherein the adapter is open-circuited when the USB controller is operating under the host mode.

7. The USB controller with an intelligent transmission mode switching function according to claim 3, wherein the adapter is configured to be selectively coupled to one of the D+ data line and the D− data line when the USB controller is operating under the device mode.

8. A transmission mode switching method to be applied to a USB controller having a data line set, a monitor unit, a host controller, and a device controller, comprising the steps of:
   setting a first time interval and a second time interval, wherein the USB controller is configured to perform a device mode operation in the first time interval and perform a host mode operation in the second time interval;
   determining if a potential on the data line set is pulled up within the first time interval;
   if it is determined that the potential on the data line set is pulled up within the first time interval, enabling the USB controller to conduct data communication under the device mode;
   if it is determined that the potential on the data line set is not pulled up within the first time interval, enabling the USB controller to conduct data communication under the host mode;
   determining if a potential on the data line set is pulled up within the second time interval;
   if it is determined that the potential on the data line set is pulled up within the second time interval, enabling the USB controller to conduct data communication under the host mode; and
   if it is determined that the potential on the data line set is not pulled up within the second time interval, enabling the USB controller to conduct data communication under the device mode.

9. The transmission mode switching method according to claim 8, wherein the first time interval and the second time interval are followed mutually to form a periodic circulation.

10. The mode switching method according to claim 8, wherein the duration of the first time interval is larger than the duration of the second time interval.

11. The mode switching method according to claim 8, wherein the USB controller further comprising:
   a power line including a front-end power line and a back-end power line, connected in series by a switch;
   a pull-up resistor having one end connected to the front-end power line; and
   an adapter connected to the other end of the pull-up resistor for selectively coupling the pull-up resistor to one of the D+ data line and the D− data line.

12. The mode switching method according to claim 11, wherein when the USB controller is operating under the host mode, the data line set is coupled to the host controller by the manipulation of the monitor unit, and the switch is ON and the adapter is open-circuited.

13. The mode switching method according to claim 11, wherein when the USB controller is operating under the device mode, the data line set is coupled to the device controller by the manipulation of the monitor unit, and the switch is OFF and the adapter is selectively coupled to one of the D+ data line and the D− data line.

14. The mode switching method according to claim 10, wherein the duration of the second time interval is slightly larger than a discharging time of an equivalent capacitor of the D+ data line and that of the D− data line.

15. The USB controller with an intelligent transmission mode switching function according to claim 8, wherein the duration of the first time interval is set by user in accordance with demands on system performance.

* * * * *